United States Patent [19]

Lyon et al.

[11] Patent Number: 4,982,280

[45] Date of Patent: Jan. 1, 1991

[54] MOTION SEQUENCE PATTERN DETECTOR FOR VIDEO

[75] Inventors: Thomas C. Lyon, San Jose; Jack J. Campbell, San Francisco, both of Calif.

[73] Assignee: Yves C. Faroudja, Los Altos Hills, Calif.

[21] Appl. No.: 381,497

[22] Filed: Jul. 18, 1989

[51] Int. Cl.[5] .................. H04N 7/18; H04N 11/20; H04N 9/11; H04N 7/01

[52] U.S. Cl. .................................... 358/105; 358/11; 358/54; 358/140; 358/97; 358/214

[58] Field of Search ............... 358/11, 12, 54, 137, 358/140, 141, 214, 105, 97

[56] References Cited

U.S. PATENT DOCUMENTS

| | | | |
|---|---|---|---|
| 4,346,408 | 8/1982 | Massmann | 358/214 |
| 4,807,034 | 2/1989 | Takeuchi et al. | 358/105 |
| 4,811,092 | 3/1989 | Achihar et al. | 358/105 |
| 4,845,557 | 7/1989 | Lang | 358/105 |
| 4,876,596 | 10/1989 | Faroudja | 358/140 |

*Primary Examiner*—John K. Peng
*Attorney, Agent, or Firm*—David B. Harrison

[57] ABSTRACT

A motion sequence pattern detector detects a periodic pattern of motion sequences within a succession of video fields, such as film mode or progressive scan mode and comprises a motion detector for detecting the presence of motion from increment to increment within predetermined increments of the succession of video fields and for thereupon putting out a first motion detection signal for each said increment, and logic circuitry responsive to the first motion detection signal for detecting the periodic pattern of motion sequences within the succession of video fields.

13 Claims, 5 Drawing Sheets

FIG.-1J

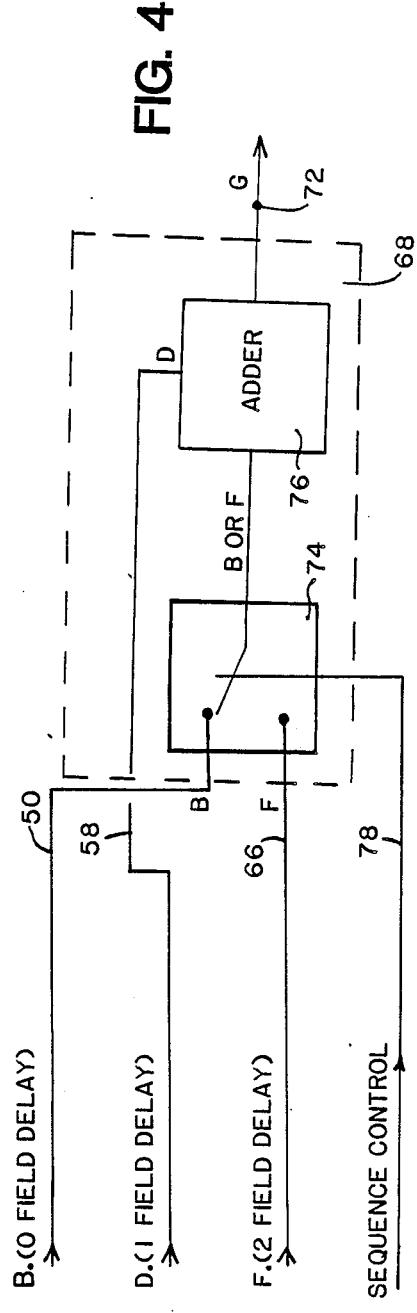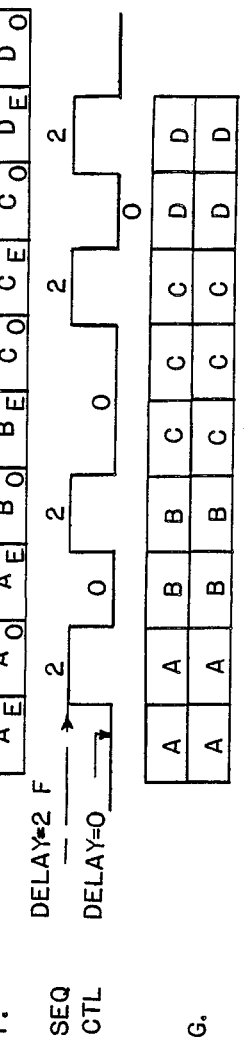

MOTION SEQUENCE PATTERN DETECTOR FOR VIDEO

FIELD OF THE INVENTION

The present invention relates to detectors for detecting unique repeating sequences within video image signals. More particularly, the present invention relates to methods and apparatus for automatically detecting unique recurrent sequences in video images which are useful indicate that the sequence originated from cinematographic film, or a progressive scan camera, for example.

BACKGROUND OF THE INVENTION

Film and television image generation systems give rise to the appearance to the viewer of continuously moving visual images. Actually, the appearance of continuous motion results from visual and mental integration by the viewer of rapidly advancing sequences of still frame images.

Conventionally, in countries having a 60 Hz primary power distribution frequency for the power grid, motion picture films are generated and are projected at one frame rate, such as 24 film frames per second, while television images are generated and displayed at another television image frame rate, such as 30 television frames per second (in the standard NTSC format, the 30 frames per second are comprised of 60 interlaced fields per second, or more precisely 59.94 fields per second within the NTSC color standard signal format).

Line scan doubling techniques have been proposed to overcome some of the drawbacks resulting from the early adoption of the 262.5 line per field scan standard for television. When the number of scan lines per field is doubled, and the result is presented in progressive scan per field format, improved visual appearance, particularly with large screen display formats, is realized.

In U.S. Pat. application Ser. No. 07/262,321 filed on Oct. 25, 1988, for "Improved Film to Video Converter with Scan Line Doubling", now U.S. Pat. No. 4,876,596, the assignee of the present invention describes methods and apparatus for controlling a scan line doubler to eliminate undesirable shimmering artifacts otherwise associated with video images which have originated from three to two, pull down ratio film conversion. The disclosure of U.S. Pat. No. 4,876,596 is specifically incorporated herein by reference.

The incorporated patent application describes apparatus for selecting time compressed frames of video in a manner which overcomes the shimmering artifact. The selection of time compressed frames was controlled by a state machine which generated a recurrent sequence of selection states described in the incorporated application based upon the particular pull down ratio of film to video and based upon the instantaneous position of a frame within the sequence.

More recently, progressively scanning cameras, operating at 30 Hz per frame without interlace, are being used to generate video image sequences which lend themselves to line doubling techniques. Thirty frame-per-second (30 FPS) film has also been a source of images particularly well suited to 60 Hz television signals generation. A need has arisen for a convenient mechanism for detecting the occurrence of a 30 Hz sequential video image sequence, in order thereby to control line doubling apparatus more efficiently and effectively.

A hitherto unsolved need has remained for a controller which automatically determines the presence of video images which progress within a unique sequence which indicates film to video transfer, or progressively scanned video frames, as the case may be.

SUMMARY OF THE INVENTION WITH OBJECTS

A general object of the present invention is to provide methods and apparatus for automatically detecting unique video image motion sequences in order to control video signal processes and equipment in a manner which overcomes limitations and drawbacks of the prior art.

A more specific object of the present invention is to provide a three-to-two film to video sequence mode detector which automatically detects the presence of sequences of a video stream originating from transfer from cinematographic film in accordance with a predetermined pull down ratio carried out during the transfer.

Another specific object of the present invention is to detect automatically the present position within a pull down transfer ratio pattern in a film to video transfer sequence within a video image stream.

Another specific object of the present invention is to automate the control of a film-to-video converter with scan line doubling, such as the converter described in the referenced U.S. Pat. No. 4,876,596.

Yet another specific object of the present invention is to provide an efficient and effective mechanism for detecting other unique video sequences, such as 30 Hz progressively scanned video sequences.

In accordance with the present invention, a film mode detector detects a unique video sequence originating as a film to video transfer at a predetermined pull down ratio, such as three to two; or detects another unique video sequence, such as 30 Hz progressively scanned video frames. In one presently preferred form, the detector includes a pixel displacement circuit for detecting displacement of a pixel within successive video frames for each field of the video sequence and having a motion signal output indicative of displacement due to the unique properties attributable to the video sequence. A low pass filter and threshold circuit low pass filters the motion signal and puts it out only when its magnitude is above a predetermined threshold level, thereby to eliminate noise and and other low level artifacts. A latch circuit latches the low pass filtered and threshold-passed motion signal for the duration of a present video field. A unique mode detection state circuit is connected to the latch means and responds to a recurrent pattern of the motion signal in the presence of motion in the video sequence as being from film frame to film frame or as being 30 Hz progressively scanned video, for example, and thereupon generates and puts out a mode signal indicating the nature of the video sequence as being from film or progressive scan, as the case may be.

In one aspect of the present invention the state circuit responds to a recurrent logical pattern of the motion signal detected within a successive field sequence originating with three to two pull down ratio film to video transfer wherein each sequence of the recurrent pattern comprises no motion, motion, motion, motion, motion values. This logical pattern is unique and characteristic of film sources, and rarely, if ever, occurs with 60 Hz interlaced scan video sources, and practically never occurs three times in a row with such video sources.

In another aspect of the present invention the state circuit includes a resynchronization state for resynching automatically to film mode when a video splice in video originating with film occurs on a boundary other than a three-to-two pull down field boundary.

In one more aspect of the present invention the state circuit comprises a mealy state machine.

In a further aspect of the present invention the film mode detector has an output adapted to control operation of a scan line doubler for eliminating timing artifacts in the resultant scan line doubled picture image.

In yet another aspect of the present invention the mode detector detects a progressively scanned recurrent video frame sequence.

These and other objects, aspects, advantages and features of the present invention will be more fully understood and appreciated upon consideration of the following detailed description of a preferred embodiment, presented in conjunction with the accompanying drawings.

Brief Description of the Drawings

In the Drawings:

FIG. 4 is a more detailed functional block diagram of the multiplexer element within the FIG. 3 circuit.

FIG. 5 is a series of timing diagrams which illustrate application of the sequencer control signal graphed in FIG. 1 to control automatically the formation of scan line doubled, progressive scan video fields which eliminate timing errors.

DETAILED DESCRIPTION OF A PREFERRED EMBODIMENT

Film Mode Detector

Figure 1:
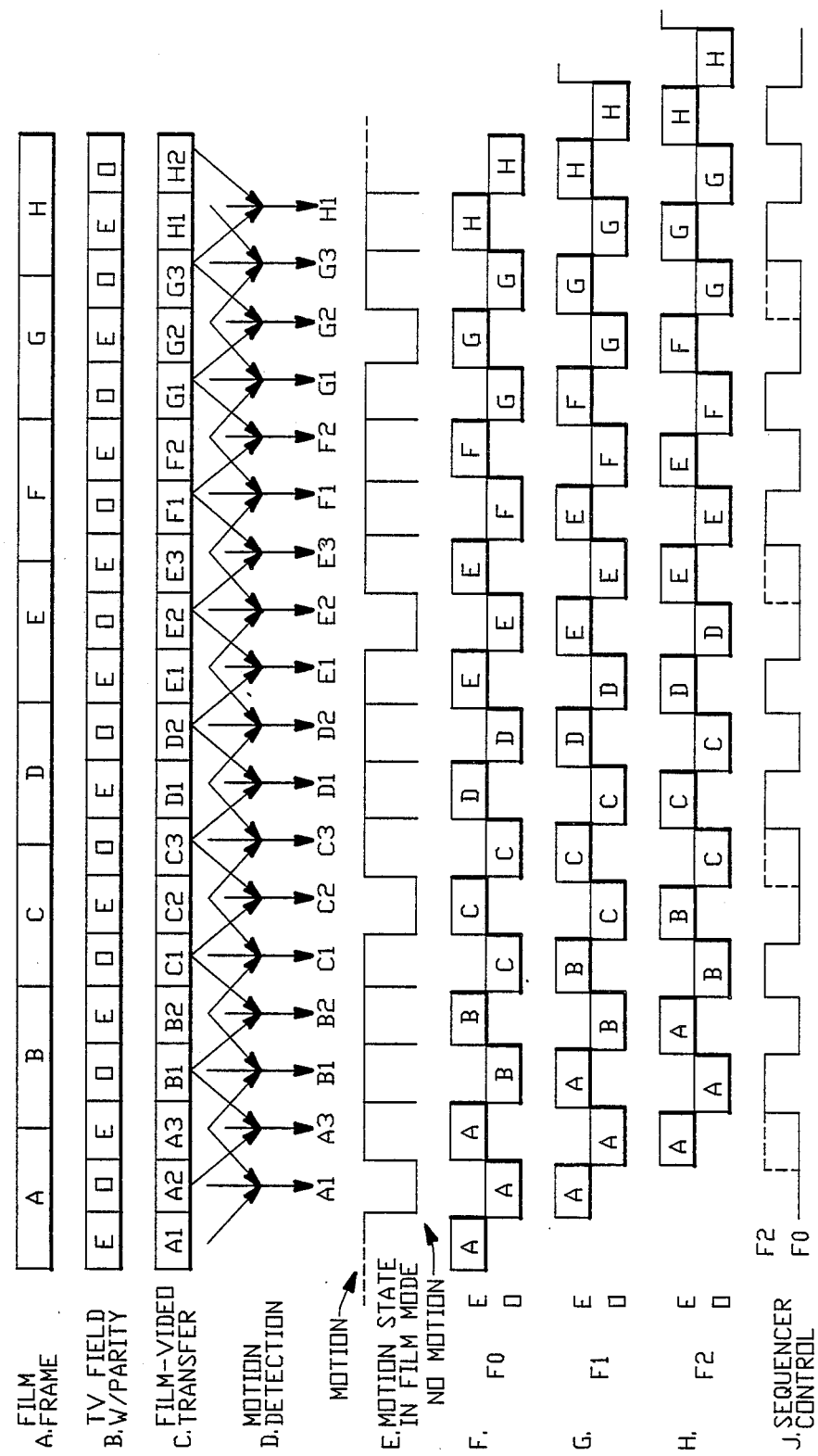
FIG. 1 is a series of graphs of film and television field scan periods in which the field rate is the time base shown which demonstrates graphically a derivation of an automatic film mode detection pattern and sequence control signal in the presence of motion between successive film frames.

A preferred embodiment of the present invention is best understood by reference to the graphs presented in FIG. 1. In the preferred embodiment, film is projected at a twenty four frame per second rate and is transferred to NTSC video having a 30 frame per second (60 interlaced field per second rate). The film is transferred to video with the conventional three/two pull down ratio, meaning that three fields of video contain the first film frame A, two fields of video contain the second film frame B, three fields of video contain the third film frame C, and so forth.

Graph 1A illustrates a progression in time of eight film frames A, B, C, D, E, F, G, and H. Graph 1B presents a corresponding sequence of interleaved even E and odd O fields of video which demonstrates a 2.5 to one (five to two) ratio between video fields and film frames. Graph 1C represents convential film to video transfer in accordance with the three to two pull down ratio discussed above.

In television systems wherein the detection of the presence of motion within successive video frames is useful for controlling processes, such as line doubling processes, it is known to compare successive television frames on a pixel by pixel basis in order to develop differences which may be indicative of motion. Because of the three to two pull down ratio for film to video transfers, as in FIG. 1C, a unique pattern emerges when frames of video resulting by transfer from film having motion between successive film frames are compared.

Such a comparison as graphed in FIG. 1D yields a recurrent pattern of motion and no motion which may be used not only to indicate that the present video image stream originated by transfer from film but also to indicate the present position within the three-to-two pull down ratio. Thus, this unique pattern is most useful for controlling generation of a sequencer control signal as graphed in FIG. 1J for control of a film mode sequencer 68 described in the referenced U.S. Pat. No. 4,876,596 and summarized hereinafter in conjunction with FIG. 2.

Returning to the graph of FIG. ID, in the process of detecting the presence of film to video transfer conditions in the video stream, if one desires to know whether the field A2 represents a motion condition or a no-motion condition, comparison may be made between fields A1 and A3. With conventional film to video transfer at the three to two pull down ratio and when each successive film frame has motion content relative to the previous film frame, it is clear by inspection that there is no motion difference between fields A1 and A3 since they both originate with film frame A. For fields A3, B1, B2 and C1, however, comparison of the previous and subsequent fields will produce a motion value when there is motion between film frames A, B and C, as graphed in FIG. 1E. When the comparison reaches field C2, however, comparison of fields C1 and C3 yields no motion value, since both fields orignate with film frame C. As can be seen in FIG. 1E, the pattern of motion and no motion conditions in this comparison is repetitive throughout the duration of the film transfer in the video image stream.

Figure 2:
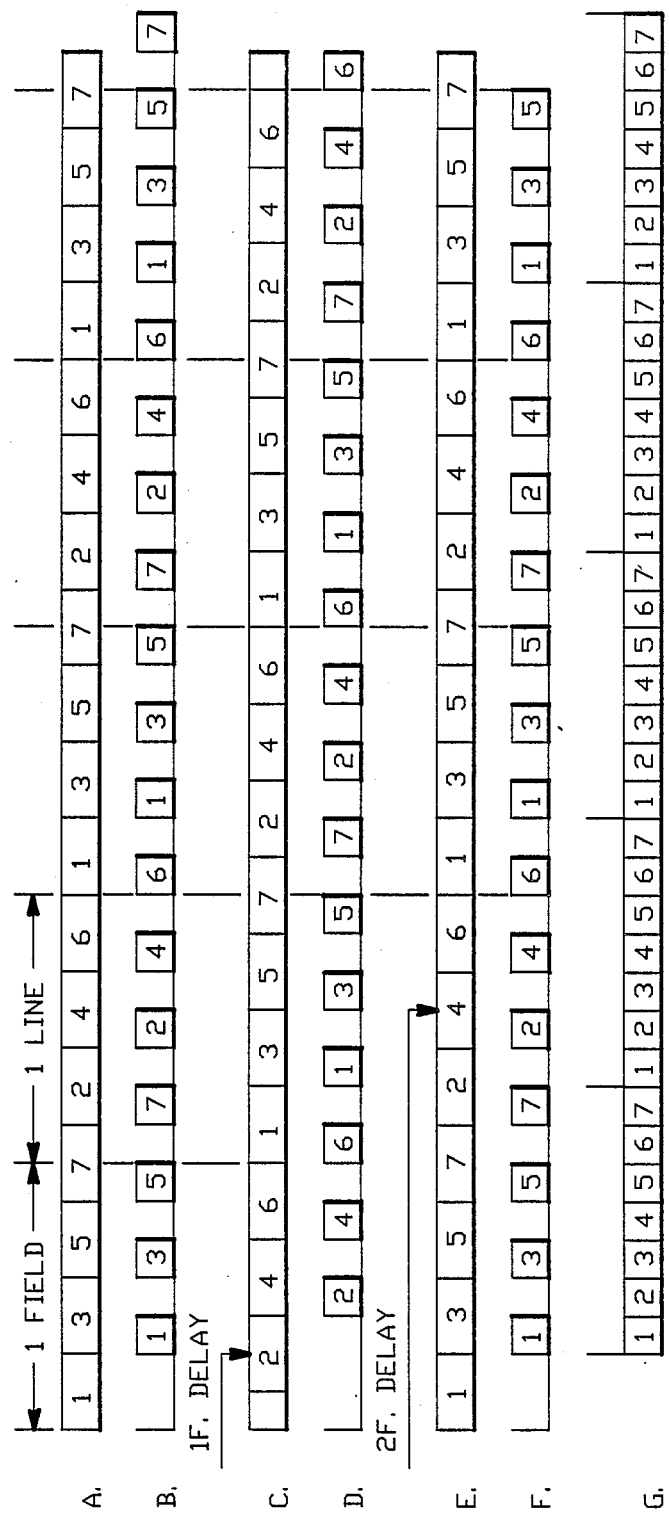
FIG. 2 is a series of graphs of a hypothetical seven-line two to one interlace television picture signal illustrating line doubling techniques in accordance with the principles of the present invention.

FIG. 2 graphs a hypothetical television picture scan format having a seven scan line frame wherein the scan lines are interlaced. FIG. 2A shows each frame as comprising scan lines 1, 3, 5, 7, 2, 4 and 6, and then repeating. With time compression, the same scan lines are halved in duration and are positioned in time as shown in FIG. 2B. FIG. 2C repeats the FIG. 2A pattern with one field delay, and FIG. 2D repeats the FIG. 2B pattern with one field delay. Similarly, FIG. 2E repeats the FIG. 2A pattern with two field delays and FIG. 2F repeats the FIG. 2B pattern with two field delays. When a line doubler system adds the FIG. 2D signal to either the FIG. 2B or the FIG. 2F signal, a properly sequenced, progressively scanned line doubled video stream results, without any of the timing error artifacts associated with prior film to video transfer/line doubling methods, as shown in FIG. 2G. In accordance with the principles of the present invention, the FIG. 1J graph represents a field rate sequencer control signal which enables this addition to be carried out upon automatic detection of film transfer within the video image stream.

With reference to FIG. 1, graph IF represents the transfer to even and odd video fields of the FIG. 1A film frames without delay. This no-delay stream is referred to as field zero or "F0". FIG. 1G graphs a one field ("F1") delayed version of the F0 stream; and, FIG. 1H graphs a two field ("F2") delayed version of the F0 video stream.

Figure 3:
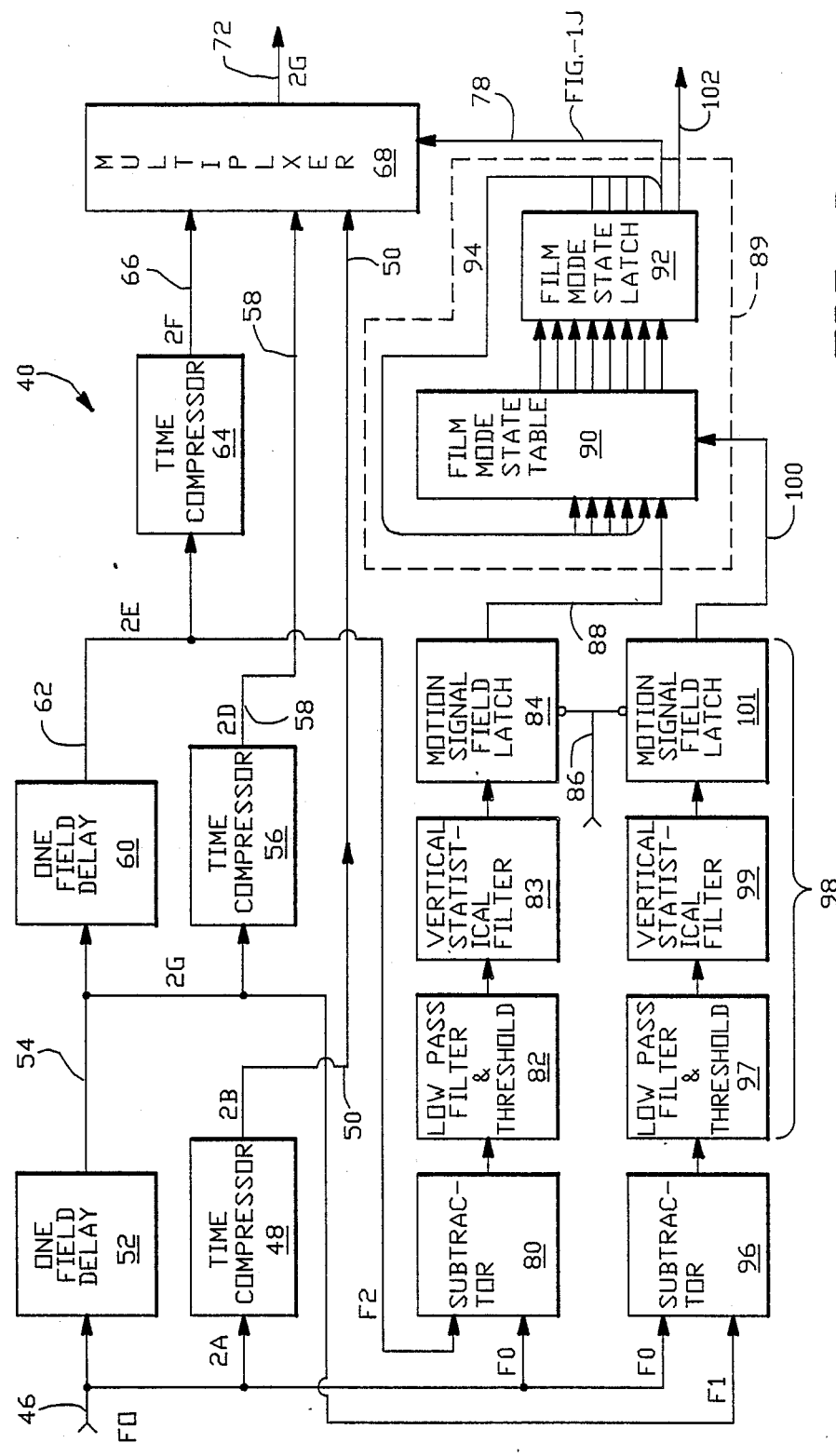
FIG. 3 is a block diagram of a video component scan line doubler and automatic film mode detection circuitry in accordance with the principles of the present invention.

FIG. 3 depicts a line doubler 40 for film mode video. It also includes circuitry enabling detection of 30 Hz progressive scan video sequences, as discussed hereinafter. An input receives an undelayed video component F0, FIG. IF and 2A, such as luminance in a monochrome or undecoded color signal path, or one of the color components R,G,B, which have been decoded (color systems require three line doubler circuits 40, one for each component. In the case of digitized chrominance pixels, time division multiplex of e.g. R-Y and B-Y components enables a single chrominance line doubler structure which is time-divided between the separate components. A first time compressor 48 puts out time compressed scan lines on a line 50 as graphed in FIG. 2B. If each incoming scan line is 62.5 microseconds in duration, for example, the video information contained in this line is compressed into 31.25 microseconds and delayed as shown in FIG. 2B.

The incoming signal F0 on the line 46 also passes through a one field delay circuit 52 to provide a one field delayed video signal F1, graphed as FIG. 1G and 2C, on a line 54 leading to a second time compressor 56 which time compresses and puts out one field delayed and time compressed video on a line 58, as graphed in FIG. 2D. The one field delay output 54 also leads through a second one field delay 60 to provide a two field delayed video signal F2, graphed as FIG. 1H and 2E, on a line 62. The line 62 leads to a third time compression circuit 64 which time compresses and puts out two field delayed and time compressed video on a line 66, as graphed in FIG. 2F.

The three output lines 50, 58 and 66 from the three respective time compressors 48, 56 and 64 lead directly to a multiplexer circuit 68 which, in proper time, selects two sequential time compressed scan lines for each incoming scan line. Thus, for an incoming video field comprising 262.5 scan lines, the multiplexer 68 puts out a video field comprising 525 scan lines, in accordance with a predetermined selection pattern for even and odd fields, as graphed for example in FIG. 5G.

FIG. 4 provides greater structural detail for the FIG. 3 multiplexer 68. As shown in FIG. 4, the multiplexer 68 functionally comprises a single pole, double throw switch 74 and an adder circuit 76. The switch 74 is under control of the sequencer control signal, FIG. 1J, on a line 78 leading from an automatic sequence controller circuit 70. As best shown in FIG. 2G, the function of the multiplexer 68 is to add the F1 time compressed signal on the line 58 with either the undelayed and time compressed signal on the line 50 or with the twice delayed and time compressed signal on the line 66.

The automatic sequence controller circuit 70 is depicted structurally within FIG. 3. The circuit 70 includes a subtractor circuit 80. The subtractor circuit 80 receives the F0 and F2 inputs on the lines 46 and 62. In a digital implementation wherein each pixel is quantized at four times subcarrier rate with eight bits of grey level, the F2 input is inverted and subtracted from the F0 input which yields a nine bit 2s complement which doubles the resolution to e.g. ½ IRE unit. This increased resolution is useful since the thresholding of the motion control signal may have an onset at a very low IRE level, such as 2-3 IRE units. The nine bit output may be passed through a look up table PROM to reduce the dynamic range of the difference signal while maintaining the same sensitivity.

The resultant motion signal which represents a gain increased, dynamic range limited difference value on a pixel by pixel basis between the F0 and F2 fields is then put through a low pass filter and threshold circuit 82. This circuit may low pass filter and stretch the difference signal into both the vertical and horizontal domains by considering adjacent difference values in these two domains. The circuit 82 also sets a minimum threshold level for the difference signal thereby to eliminate any noise. The threshold value is set so that the difference signal is only derived and put out from robust motion characteristics in the picture, and is not going to be derived from noise or other non-motion artifacts. A signal representative of robust motion activity at a present pixel neighborhood is put out by the circuit 82 to a vertical statistical filter 83.

There are e.g. eight inputs to the vertical statistical filter 83 which are the eight outputs of eight single bit line delay units. The output of the statistical filter 83 is "1" if at least n of its inputs are high, and "0" if not. The value n is selected by the user to provide a desired vertical statistical correlation in the motion activity signal put out by the low pass filter and threshold circuit 82. The output of the vertical statistical filter leads directly to a motion signal field latch circuit 84.

The motion signal field latch circuit 84 is reset to zero at the beginning of each field period at the original scan rate. If a motion signal is received from the low pass filter and threshold circuit 82 at any time during the present field interval, the latch 84 becomes set for the remainder of the field. The first occurring signal from the circuit 82 is effective to latch the circuit 84. If no motion signal is received during a field interval, the latch remains at its reset value. In the presence of motion within the picture, the latch 84 becomes set when the motion is first detected, and remains set for the remainder of the field.

An output line 88 carrying the motion signal from the latch 84 enters a film mode algorithm state table decoder 89 which comprises a mealy state machine including a look-up PROM 90 and a register 92 connected to recirculate five bit positions of the output of the register 92 to address line positions of the PROM 90. The low order address bit position for the PROM 90 is provided by the motion output line 88. The state machine 89 thus configured is responsive to a pattern of successive film motion bits on the line 88 at the original field scan rate, such as 0111101111011110, etc., as graphed in FIG. 1E. This pattern is tested by the state machine 89 and if found to be present over several repetitions is used to generate and synchronize the sequencer control signal, FIG. 1J which controls the multiplexer 68. If the state machine happens to be in the video mode (non-film originated video stream) the line doubler portion 40 of the FIG. 3 circuit may be controlled so as to select and put out temporal interpolation values derived from F0 or F2 pixels whenever motion is not present on a pixel by pixel basis via another control circuit, not shown, and then switch to an intra-field average value for a pixel when in motion, as is conventional.

When in the video mode, and the state machine 89 is in state zero, i.e. awaiting occurrence of the FIG. 1E pattern, the state machine looks for a zero followed by four ones, on a field clock basis. When this pattern is found, it is tested again. Two successive sequences of the film mode pattern cause the state machine 89 to enter the film mode. When in the film mode, the state machine 89 generates and puts out a predetermined pattern, such as the pattern graphed as FIG. 1J for controlling the multiplexer 68. With this control, a properly arranged, line doubled output may be obtained which eliminates all timing errors. Such an arrangement is graphed in FIG. 5G.

The film mode continues until a motion pattern of successive ones on the line 88 which is inconsistent with the film pattern causes a return to the video mode. A pattern of continuous zeros will not cause the state machine 89 to change states, either from video to film mode or from film mode to video mode. A discontinuity in the film mode pattern also will not cause the state machine immediately to switch to the video mode, since such discontinuity may be a video recording splice occurring at other than a three to two boundary of two video streams originating as film transfers. Once the film mode is entered, this mode is preferred and will not be left by the state machine 89 until there is a significant sequence of non-film originated video which is inconsistent with the FIG. 1E pattern.

Figure 6:
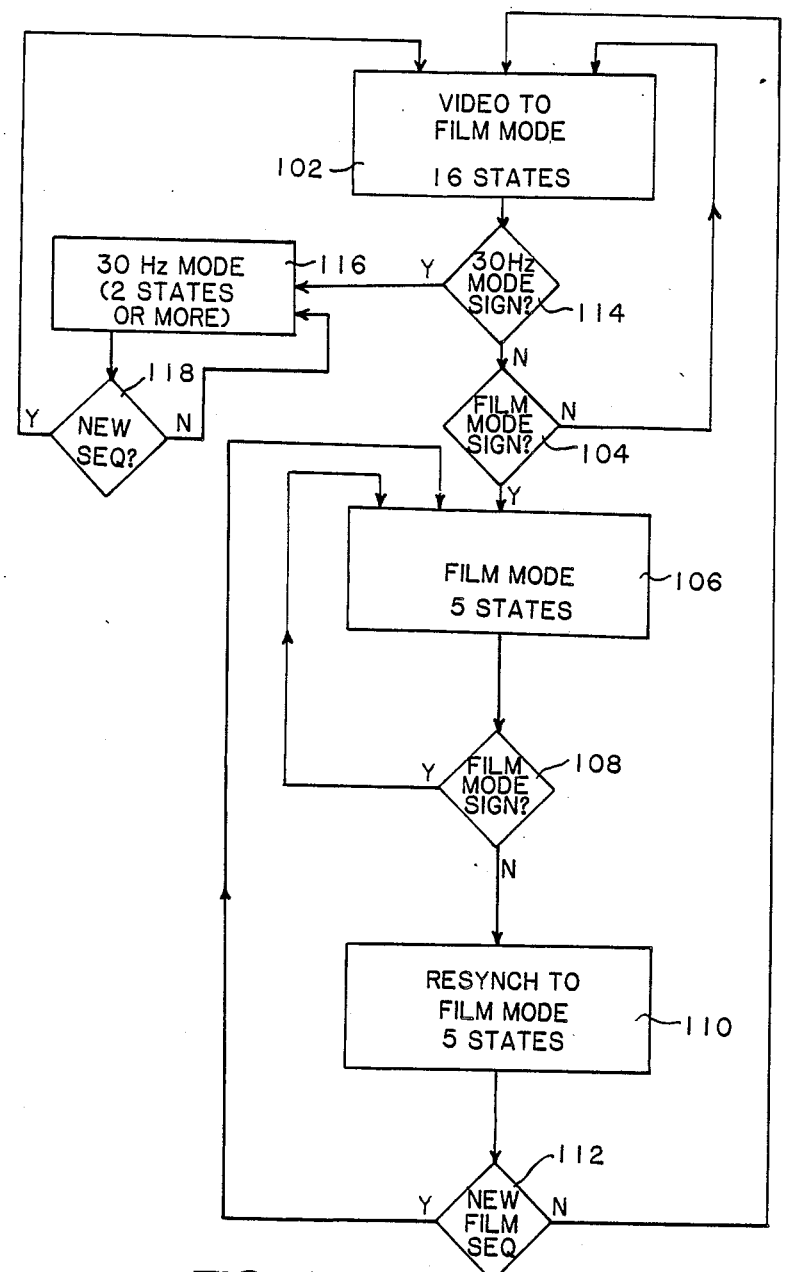
FIG. 6 is a logic flow diagram illustrating film mode detection and 30 Hz mode detection of the state machine of FIG. 3.

FIG. 6 sets forth a state diagram for the state machine 89 which is adapted to detect film mode sequences as well as 30 Hz sequences. The blocks 112, 114 and 116 are discussed hereinafter in conjunction with detection of 30 Hz motion sequences.

A first step 102 includes a test for a "1" following a "0"; followed by four "1"s in a row; followed by a "0". If this unique video sequence repeats three times in a row, a logical node 104 determines that the film mode sequence has been detected. The recurrent pattern tested by the step 102 results in a film mode "signature" which is detected at the logical node 104. If a single "1" is missed, the step 102 is cleared and a second attempt is made to find a film mode signature Each logical test of the node 104 which is negative results in a return to the step 102.

A successful detection of film mode signature at the node 104 causes the state machine 89 to progress to a step 106 which tests each fifth state to be a "0" in accordance with the unique sequence attributable to film to video transfer. A logical node 108 tests this fifth state, and if a "0" is present, loops the machine 89 back to the step 106. This loopback continues for the duration of film mode video sequences.

If any fifth state of the step 106 is not a "0", as tested by the logical node 108, a resynchronization step 110 is entered. If four "1"s are followed by one "0", as tested at a node 112, a return is made to the film mode step 106. However, if the video sequence fails to follow this pattern, video mode is resumed, and the machine returns to the initial test state 102.

The output of the state machine 89 conveys two characteristics: it identifies the film mode as present in the video stream, and it is used to identify the present location within the three-to-two pull down film to video transfer pattern. This identification is most useful in generating a predetermined multiplexer control pattern, such as the pattern of FIG. 1J. Also, the state machine is very useful for generating a coded control signal or pulse into e.g. the vertical interval of a video recording of a video stream originating with film transfer. This information may then be used by a less sophisticated system, such as described in the referenced U.S. Pat. No. 4,876,596 for controlling line doubling processes of film mode video. From the foregoing discussion of is operation, particularly in conjunction with FIG. 6, it will be readily apparent to those skilled in the art that the state machine 89 may be implemented in many variant ways, including a programmed digital microcontroller.

While the switching pattern graphed as FIG. 1J is very useful in controlling selection of video fields in order to eliminate time discontinuities in line doubled video originating by transfer from film frames, other patterns as described in the referenced U.S. Pat. No. 4,876,596 are equally suited to this task, the present invention residing in the method and apparatus for detecting the presence of a unique video sequence, such as film mode.

30 Hz Progressive Scan Detection

Returning to FIG. 3, the incoming video sequence F0 and the one field delayed video sequence F1 are subtracted within a subtractor circuit 96 to provide a difference signal. This signal is then processed within a motion detector circuit 98. The motion detector 98 includes a low pass filter and threshold circuit 97, a vertical statistical filter 99 and a motion signal latch 101. The structural elements 97, 99 and 101 generally correspond to the structures 82, 83 and 84 of the film mode detector. An output line 100 leads directly to the state machine 89, and an output 102 from the state machine 89 is true whenever it detects the presence of 30 Hz progressively scanned video within the incoming video stream, for example.

The state machine 89 is configured to respond to the incoming video such that if a field difference (F0-F1) sequence on the line 100 follows a pattern of 01010 . . . . This information, by itself, is sufficient to detect 30 Hz sources. It is reinforced, however, by combination with the information present and available on line 88 which should simultaneously follow a pattern of 11111 . . . . These field and frame patterns are obtained only in the presence of motion from frame to frame within 30 Hz progressively scanned video image sequences. And, the state machine 89 thereupon provides a control value over the line 102 which may be used to control a scan line doubler in a manner best adapted to incoming progressively scanned 30 Hz frames.

With reference again to the FIG. 6 flow diagram, a node 114 immediately following the block 102 tests if the pattern has a 30 Hz signature. If so, program execution is routed to a block 116 which tests for the 30 Hz sequence signature for two states or more. If the 30 Hz signature is present, a logical node 118 loops back to the input of the block 116. If a new sequence pattern is detected at the node 118, a return is made to the first block 102, and the state machine 89 is essentially reset.

While the method and apparatus of the present invention have been summarized and explained by illustrative applications in automatic unique sequence mode detection and control for video signal processes, such as film to video transfers associated with scan line doubling for increased display resolution, it will be readily apparent that many widely varying embodiments and applications are within the teachings and scope of the present invention, and that the examples presented herein are by way of illustration only and should not be construed as limiting the scope of this invention.

We claim:

1. A motion sequence pattern detector for detecting a periodic pattern of motion sequences within a video temporal signal stream, comprising first motion detector means for detecting the presence of motion by comparing spatial picture data to similarly located successive spatial picture data within the video temporal signal stream and for thereupon putting out a first motion detection signal for each comparison of said data, and logic means responsive to a sequence of first motion detection signals for detecting said periodic pattern of motion sequences within the video temporal signal stream.

2. The pattern detector set forth in claim 1 wherein the first motion detector means comprises pixel displacement circuit means for detecting displacement of at least one pixel within successive successive ones of the spatial picture data of the video temporal signal stream, low pass filter and threshold circuit means for low pass filtering the motion signal and putting it out only when its magnitude is above a predetermined threshold level, thereby to eliminate noise and other low level artifacts and latch circuit means for latching the low pass filtered and threshold-passed motion signal for the remainder of a present video field.

3. The pattern detector set forth in claim 2 for detecting 30 frame-per-second source origination within a 60 Hz video field sequence of the video temporal signal stream as the said motion sequence pattern, wherein the time period between successive spatial picture data is a scan field time period and the pixel displacement means detects pixel displacement within successive video fields, and wherein the logic means responds to a recurrent logical pattern of the motion detection signals within a successive field sequence wherein a sequence of the recurrent logical pattern comprises a repeating pattern of no motion and motion.

4. The pattern detector set forth in claim 2 for detecting a 24 frame-per-second film frame to video field sequence mode as the said motion sequence pattern and wherein the period between successive video spatial picture data is a frame period and the pixel displacement circuit means detects displacement of at least one pixel within successive video frames for each field of the video temporal signal stream and wherein the film pull down ratio is three-to-two and wherein the logic means responds to a recurrent logical pattern of the motion signals detected within a successive field sequence wherein the periodic pattern comprises a repeating sequence of no motion, motion, motion, motion, motion.

5. The pattern detector set forth in claim 4 wherein the logic means includes resynchronization means for resynching to the said repeating sequence when a video splice in video orignating with film occurs on a boundary other than a three-to-two pull down field boundary.

6. The pattern detector set forth in claim 1 wherein the logic means comprises a state machine.

7. The pattern detector set forth in claim 1 wherein the logic means comprises a programmed digital processor.

8. The pattern detector set forth in claim 4 having an output adapted to control operation of a scan line doubler for eliminating timing artifacts in the resultant scan line doubled picture image.

9. The pattern detector set forth in claim 2 further comprising vertical statistical filter means connected between the low pass filter and threshold means and the latch means for correlating vertically the motion signal in accordance with a predetermined correlation factor.

10. The pattern detector set forth in claim 1 wherein the time period between successive ones of the spatial picture data of the first motion detector means is a frame period and further comprising second motion detector means for detecting displacement of at least one pixel of the video temporal signal stream on a field by field basis for providing second motion signals, the logic means being further connected to the second motion detector means for responding simultaneously to different recurrent patterns of the first and second motion signals, thereby to generate and put out a mode signal indicating detection and non-detection of a further unique video sequence within the video temporal signal stream.

11. The pattern detector set forth in claim 10 wherein the pattern of the first motion signal is motion, motion, motion, motion, motion, and wherein the simultaneous pattern of the second motion signal is no motion, motion, no motion, motion, no motion, and wherein the further unique video sequence corresponds to progressively scanned video frames without field interlace.

12. The pattern detector set forth in claim 10 wherein the first motion detector means comprises first pixel displacement circuit means for detecting displacement of a pixel within successive video increments of the video sequence to produce the first motion signal, first low pass filter and threshold circuit means for low pass filtering the first motion signal and putting it out only when its magnitude is above a predetermined threshold level, thereby to eliminate noise and and other low level artifacts, and first latch circuit means for latching the low pass filtered and threshold-passed first motion signal for the remainder of a present video field; and wherein the second motion detector means comprises second pixel displacement circuit means for detecting displacement of a pixel within successive video increments of the video sequence to produce the second motion signal, second low pass filter and threshold circuit means for low pass filtering the second motion signal and putting it out only when its magnitude is above a predetermined threshold level, thereby to eliminate noise and other low level artifacts, and second latch circuit means for latching the low pass filtered and threshold-passed second motion signal for the remainder of a present video field.

13. The pattern detector set forth in claim 12 wherein the first motion detector means includes first vertical statistical filter means connected between the low pass filter and threshold means and the latch means of the first motion detector for correlating vertically the first motion signal in accordance with a predetermined correlation factor, and further comprising second vertical statistical filter means connected between the low pass filter and threshold means and the latch means of the second motion detector means for correlating vertically the second motion signal in accordance with a predetermined correlation factor.

* * * * *